United States Patent [19]
Kaneda et al.

[11] 4,393,015
[45] Jul. 12, 1983

[54] PROCESS OF PRODUCING URETHANE-MODIFIED POLYISOCYANURATE FOAMS

[75] Inventors: Hiroshi Kaneda, Higashimurayama; Katsuhiko Arai, Kodaira; Akira Suzuki, Hidaka; Takashi Ohashi, Iruma, all of Japan

[73] Assignee: Bridgestone Tire Co., Ltd., Tokyo, Japan

[21] Appl. No.: 337,154

[22] Filed: Jan. 5, 1982

[30] Foreign Application Priority Data

Jan. 16, 1981 [JP] Japan ................................... 56-3760

[51] Int. Cl.$^3$ ...................... C08G 18/14; C08G 18/48; C08G 18/18; C08G 18/22
[52] U.S. Cl. ..................................... 264/51; 264/45.3; 521/110; 521/115; 521/116; 521/125; 521/129; 521/131; 521/160; 521/175; 521/902; 521/914
[58] Field of Search ............... 521/902, 125, 129, 914, 521/110, 116, 115, 131, 160, 175; 264/51, 45.3

[56] References Cited

U.S. PATENT DOCUMENTS

| | | |
|---|---|---|
| 4,009,130 | 2/1977 | Zimmerman et al. ............... 521/902 |
| 4,189,541 | 2/1980 | Ohashi et al. ......................... 521/902 |
| 4,190,711 | 2/1980 | Zdrahala et al. ..................... 521/112 |
| 4,243,760 | 1/1981 | McDaniel et al. .................... 521/176 |
| 4,254,069 | 3/1981 | Dominquez et al. ................. 264/51 |
| 4,256,846 | 3/1981 | Ohashi et al. ......................... 521/117 |
| 4,273,884 | 6/1981 | Dominquez ........................... 521/114 |
| 4,273,885 | 6/1981 | Dominquez et al. ................. 521/115 |

Primary Examiner—H. S. Cockeram
Attorney, Agent, or Firm—Darby & Darby

[57] ABSTRACT

A process for producing urethane-modified polyisocyanurate foams in which a poly(oxyalkyleneoxyethylene)polyether polyol is used as a modifying agent having the number of functional groups and the molecular weight in specific ranges with the equivalent ratio of NCO/OH being in a specific range and containing a specific quantity of ethylene oxide. The use of this modifying agent provides urethane-modified polyisocyanurate foams exhibiting excellent fire resistance and adhesion to an object surface.

20 Claims, No Drawings

PROCESS OF PRODUCING URETHANE-MODIFIED POLYISOCYANURATE FOAMS

This invention relates to a process of producing urethane-modified polyisocyanurate foams and, more particularly, to a process of producing fireproof polyurethane-modified isocyanurate foams which have high adhesive strength with respect to the surface of an object and excellent fire resistance capable of meeting "fireproof requirements" according to the Incombustibility Standard of Japanese Railway Vehicle Materials and of passing Grade 3 incombustibility and Grade 2 incombustibility, when the forms are used in laminated boards, according to Japanese Industrial Standards (JIS) A-1321 Combustion Test.

Generally, the properties of urethane-modified polyisocyanurate foams are largely influenced by the kind of modifying polyols used and the equivalent ratio (NCO/OH) of isocyanate to the polyols. Heretofore, various improvements have been made on urethane-modified polyisocyanurate foams which have excellent heat resistance and which are flameproof and less brittle have been obtained. However, such improved polyisocyanurate foams have shown insufficient adhesion when sprayed on an object surface by a spray foaming machine while they have satisfied fireproof requirements or the converse has held true because the polyols used or an NCO/OH ratio is improper. In practice, satisfactory urethane-modified polyisocyanurate foams having both excellent incombustibility and adhesion strength have not yet been obtained.

The inventors have studied the urethane-modified polyisocyanurate foams to eliminate the above-mentioned drawbacks, and have found a process for producing urethane-modified polyisocyanurate foams in which a poly(oxyalkyleneoxyethylene)polyether polyol is used as a modifying agent having the number of functional groups and the molecular weight in specific ranges with the equivalent ratio of NCO/OH being in a specific range and containing a specific quantity of ethylene oxide. The use of this modifying agent provides urethane-modified polyisocyanurate foams showing excellent adhesion to an object surface and capable of satisfying "fireproof requirements" according to the Incombustibility Standard of Japanese Railway Vehicle Materials, and of passing Grade 3 Incombustibility and Grade 2 Incombustibility, when the foams are used in laminated boards, according to Japanese Industrial Standard (JIS) A-1321 Combustion Test.

Specifically, according to the present invention there is provided a process of producing urethane-modified polyisocyanurate foams by reacting an organic polyisocyanate with a polyol in the presence of a catalyst, a blowing agent and a surfactant to form a urethane-modified polyisocyanurate foam, wherein (1) said polyol is at least one poly(oxyalkyleneoxyethylene)polyether polyol having not less than two functional groups and containing from about 10 to about 50% by weight of ethylene oxide;

(2) the molecular weight of said polyol is within a range of about 500 to about 1,500 when said polyol is used singly, and the average molecular weight $\overline{M}$ of said polyols is within a range from about 500 to about 2,500 and is represented by the formula $$\overline{M} = \frac{M_1A_1 + M_2A_2 + \ldots}{A_1 + A_2 + \ldots}$$

wherein $M_1, M_2, \ldots$ are molecular weights of said polyols, and $A_1, A_2, \ldots$ are quantities thereof in parts by weight, when more than one said polyols are used in the form of a mixture;

(3) said polyol is used in an equivalent ratio to organic polyisocyanate of about 0.05 to 0.5; and (4) said catalyst is an alkali metal salt of a carboxylic acid or combination thereof with a tertiary amino compound.

The particular process of the present invention is suitable for producing fireproof polyisocyanurate foams used in heat insulators, structural materials and the like.

Urethane-modified polyisocyanurate foams according to the present invention having the above-mentioned desired properties can be obtained only when the foams are prepared according to the above composition.

As the polyol, at least one poly(oxyalkyleneoxyethylene)polyether polyol having not less than two functional groups, preferably three or four functional groups per molecule, and containing about 10 to about 50% by weight of ethylene oxide is required in the present invention. If the polyol has fewer than two functional groups, the cell density of the foams produced will be too small, resulting in poor adhesiveness to an object surface which is undesirable. More than four functional groups cause the cell density to become too large and reduces the degree of the reaction, whereby the adhesiveness and incombustibility of the foams are impaired. With less than about 10% by weight of ethylene oxide, the fire resistance of the foams decreases to an unacceptable level. On the other hand, with more than 50% by weight of ethylene oxide the compatibility of the polyol with blowing agents such as trichloromonofluoromethane becomes degraded and the proportion of closed cells in the foams is reduced, so that the stability of the foam-forming solution during storage and the thermal insulation property of the foams become degraded.

The molecular weight of the polyol employed in this invention must be within a range of about 500 to about 1500 for one polyol. For more than one polyol, the average molecular weight $\overline{M}$ thereof as represented by the following formula I must be within a range of about 500 to about 2500:

$$\overline{M} = \frac{M_1A_1 + M_2A_2 + \ldots}{A_1 + A_2 + \ldots} \tag{I}$$

wherein $M_1, M_2, \ldots$ are the molecular weight of the respective polyols, and $A_1, A_2, \ldots$ are the quantities of the polyols used in parts by weight. For both cases, at lower molecular weights the polyol concentration in the foams is reduced, resulting in poor adhesiveness. On the other hand, at higher molecular weights the polyol concentration becomes too high, so that the fireproof property and the dimensional stability of the foams are unduly impaired.

The polyol or polyols according to the present invention are used in an equivalent ratio to an organic polyisocyanate of about 0.05 to about 0.5, and preferably about 0.15 to about 0.4. At ratios of more than 0.5, the fire resistance of the foams decreases to an unacceptable level, although the adhesiveness to an object surfaces is improved. At ratios of smaller than 0.1, the former is enhanced but the latter is degraded, so that the foams are easily separated from the object surface and are not acceptable for practical use.

Employed as suitable polyols in the present invention are poly(oxyalkylene-oxyethylene)polyether polyols obtained by adding ethylene oxide and alkylene oxides such as propylene oxide, butylene oxide, and styrene oxide to a base substance such as ethylene glycol, propylene glycol, trimethylol propane, glycerin, 1,2,6-hexane triol, pentaerythritol, sorbitol, and sucrose; these polyols containing about 10 to about 50% by weight of ethylene oxide and having the above-identified molecular weight ranges. It is preferred to use propylene oxide as the alkylene oxide in view of price, properties and availability.

Any organic polyisocyanate used in the prior art can be employed in the preparation of the urethane-modified polyisocyanurate foams of this invention. The organic polyisocyanate means an organic compound having two or more isocyanate groups per molecule and includes aliphatic polyisocyanates, aromatic polyisocyanates, mixtures and modified substances thereof. The aliphatic polyisocyanates include hexamethylene diisocyanate, isophorone diisocyanate, dicyclohexylmethane diisocyanate, methylcyclohexane diisocyanate and the like. The aromatic polyisocyanates include tolylene diisocyanate (2,4 and/or 2,6-isomers), diphenylmethane diisocyanate, ditolylene diisocyanate, naphthalene diisocyanate (e.g., 1,5-naphthalene diisocyanate), triphenylmethane triisocyanate, dianisidine diisocyanate, xylylene diisocyanate, tris(isocyanate phenyl) thiophosphate, polynuclear polyisocyanate having the following formula

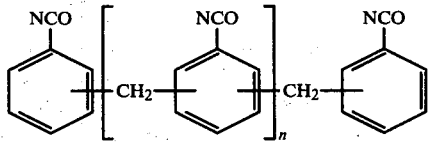

wherein n is 0 or an integer of 1 or more (so-called crude MDI or polymeric isocyanate) obtained by reacting a low polycondensate of aniline and formaldehyde with phosgene, undistilled tolylene diisocyanate and the like. Further, prepolymers having two or more isocyanate groups, which are obtained by any conventional method, for example, prepolymers having a urethane group, a biuret group, an isocyanurate group, a carbodiimide group, an oxazolidone group or the like may be used. These polyisocyanates may be used alone or in admixture of two or more polyisocyanates. As the organic polyisocyanate, the aromatic polyisocyanates, particularly polynuclear aromatic polyisocyanates are preferable in view of flameproofing.

The isocyanate trimerization catalyst used in the present invention includes alkali metal salts of carboxylic acids having a carbon number of 2 to 12 or a combination thereof with tertiary amino compounds. The former includes potassium acetate, potassium propionate, potassium 2-ethylhexanoate, potassium caprylate and the like or a mixture thereof. The latter includes dialkylaminoalkyl phenols such as 2,4,6-tris(dimethylaminomethyl)phenol, a mixture of 2,4- and 2,6-bis(-dimethylaminomethyl) phenols and the like, triethylamine; triazine cyclic derivatives such as N,N', N''-tris(-dimethylaminopropyl)-sym-hexahydrotriazine and the like; tetraalkylalkylene diamines; dimethylethanol amine; triethylenediamine and its lower alkyl substituted derivatives; and mixtures thereof.

According to the present invention, it is preferred to use the alkali metal salt of a carboxylic acid dissolved in at least one low molecular weight diol as represented by the general formula

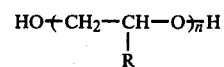

wherein R is hydrogen or methyl and n is 1,2 or 3. Although the effects of the present invention can be achieved even without the addition of the low molecular weight diols, the low molecular weight diols may be used in the present invention in an equivalent ratio to the organic polyisocyanate of less than about 0.2, and preferably about 0.01 to about 0.1. Beyond the upper limit of 0.2, the adhesiveness of the foams prepared decreases significantly.

The low molecular weight diols include, for example, ethylene glycol, propylene glycol, diethylene glycol, dipropylene glycol, triethylene glycol and tripropylene glycol.

The use of a urethane formation promotion catalyst as a promoter for the above-listed trimerization catalysts is effective. The urethanated catalyst employed can be any of these known to be useful for this purpose, such as metallic catalysts including dibutyl tin dilaurate, stannous octoate, and the like; and amine catalysts including N,N-dimethyl ethanol amine, triethylene diamine, and the like.

The blowing agent employed in the present invention can be any of those used in the production of conventional polyurethane foams or polyisocyanurate foams. For instance, the blowing agent includes carbon dioxide gas generated by adding water to the reaction mixture or supplied from an external source, nitrogen gas and a mixture thereof. However, the preferred blowing agent is a low-boiling inert solvent evaporating by a heat of reaction in the foaming process. Such a solvent is a fluorinated and/or chlorinated hydrocarbon having a good compatibility, a typical example of which includes trichloromonofluoromethane, dichlorodifluoromethane, dichloromonofluoromethane, monochlorodifluoromethane, dichlorotetrafluoroethane, 1,1,2-trichloro-1,2,2-trifluoroethane, methylene chloride, trichloroethane and the like. Further, benzene, toluene, pentane, hexane and so on may be used. These blowing agents may be used alone or in an admixture thereof. Among them, trichloromonofluoromethane is most preferable as the blowing agent in view of the foaming properties, ease of foaming and the like.

The addition amount of the low-boiling inert solvent as a blowing agent is preferably about 5 to about 50% by weight of the foam forming composition. Water as a blowing agent is required in quantities of not more than 0.5 parts by weight per 100 parts by weight of the organic polyisocyanate. Above this amount, the fire resistance of the foams produced is degraded to an unacceptable level. As the surfactant, use may be made of any one usually used in the production of polyurethane foams and polyisocyanurate foams, an example of which includes an organosilicone surfactant such as organopolysiloxanepolyoxyalkylene copolymer, polyalkenyl siloxane having a side chain of polyoxyalkylene and the like. Further, oxyethylated alkyl phenol, oxyethylated aliphatic alcohol, ethylene-propylene oxide block polymer and so on are effective as the surfactant. The surfactant is usually used in an amount of about 0.01 to 5 parts by weight per 100 parts by weight of the organic polyisocyanate.

In addition to the above-mentioned ingredients, the other additives which can be used in preparing urethane foams, e.g., pigment, plasticizer, fire retardant, etc. may be used if needed.

The production of the foams according to the invention may be carried out by any well-known processes, but is usually performed as follows. That is, the polyols as an urethane modifying agent, catalyst and blowing agent are mixed with stirring by adding a foam stabilizer and other additives, if necessary, to form a homogeneous mixed solution. Added to this solution is the organic polyisocyanate with stirring, and then the resulting reaction mixture is extruded and foamed in a mold or the like by pouring, spraying and the like.

The production of the foams according to the present invention is effectively carried out when a spray foaming machine is used, in which case a premix solution (solution A) obtained by mixing the polyols, catalyst, blowing agent, surfactant, and other additives, if necessary and an organic polyisocyanate (solution B) are subjected to spray foaming in a spray foaming machine, e.g., a high pressure airless type foaming machine, in which each of the solutions A and B is pumped by plunger pump into cylinder pump where they are weighed and pressurized to about 40 atm. Thereafter they are heated to about 40° C. while being passed through heaters and are then mixed together at a mixing head to foam a mixed solution. The solution is injected from the nozzle and sprayed onto an object to be coated with foams thereby formulating the foams.

Laminated boards obtained by spray foaming or injection foaming the urethane-modified polyisocyanurate foams of this invention on surface materials are useful for heat insulators or structural materials used for railway vehicles, residential buildings, office buildings, storehouses, etc.

EXAMPLES

The effects of the present invention were evaluated by the methods below.

1. Combustion test according to Incombustibility Standard of Japanese Railway Vehicle Materials A test piece 257 mm long, 185 mm wide and 30 mm thick was cut from a foam which is prepared by the above-mentioned method. The test piece was held at 45° with horizontal plane and a fuel vessel was placed on a base material such as cork having low thermal conductivity so that the center of the vessel was positioned below the center of the lower surface of the test piece at a distance of 25.4 mm. Ethyl alcohol contained in an amount of 0.5 ml in the vessel was ignited and allowed to be burnt out. The evaluation of the combustion of the foam was made on the basis of the acceptable standards shown in Table 1 during and after the burning of the alcohol.

TABLE IA

| Incombustibility Standard of Japanese Railway Vehicle Materials | | | | |
|---|---|---|---|---|
| | During the burning of the alcohol | | | |
| | fire | flame | fume | flame strength |
| Acceptable standards | present | present | passing through the | flame should not go over the top end of |

TABLE IA-continued

| Incombustibility Standard of Japanese Railway Vehicle Materials | | | |
|---|---|---|---|
| During the burning of the alcohol | | | |
| fire | flame | fume | flame strength |
| | | test piece | the test piece |

TABLE 1B

| | After the burning of the alcohol | | | |
|---|---|---|---|---|
| | Lingering flame | cinder | carbonization | deformation |
| Acceptable standards | none | none | reaching the top end of the test piece | reaching the periphery of the test piece. A hole may pass through the piece. |

2. JIS A-1321 Combustion Test For Internal Finish Materials Of Buildings

The surface test according to JIS A-1321 is carried out by placing a test piece in the form of a foam sheet or a laminated board using foam sheet as a core material with a length, width and thickness of 22 cm×22 cm×2.4–2.8 cm in a heating furnace and then heating a surface of the test piece for a predetermined period using gas as a sub-heat source and an electric heater as a main heat source. Thereafter, the presence and degree of cracking/deformation, the time of lingering flame after the completion of heating, heat release value (temperature-time area $Td\theta$ (°C.×min.) calculated from the difference between the exhaust temperature curve of the test piece and the reference temperature curve under the same conditions of perlite plate as a standard material, and the fuming factor calculated from the maximum fuming quantity are measured to judge the fireproof property of the test piece on the basis of the acceptable standard values for Grade 3 incombustibility shown in the following Table 2A and for Grade 2 incombustibility in the Table 2B.

TABLE 2A

| Acceptable standard values of Grade 3 incombustibility According to JIS A-1321 Combustion Test | | | | |
|---|---|---|---|---|
| Class | Heat release value (°C. × min.) | Fuming factor | Time of lingering flame (sec.) | Cracking deformation | Exhaust temperature at any time within three minutes |
| Surface test | not more than 350 | not more than 120 | not more than 30 | not considerably harmful | below the reference temperature |

Further, an annexed test of the laminated board is carried out under the same conditions as described above, except that three holes of 2.5 cm diameter are pierced from front of the test piece to rear side thereof in place. The results are judged on the basis of acceptable standard values shown in Table 2B. In this case, the evaluation of the term "cracking/deformation" is omitted.

TABLE 2B

| Acceptable standard values of Grade 2 incombustibility (quasi-incombustible material) according to JIS A-1321 combustion test | | | |
|---|---|---|---|
| Class | Heat release value (°C. × min.) | Fuming factor | Time of lingering flame (sec.) | Cracking/ deformation |
| Surface test | not more | | not more | not more | no harmful |

TABLE 2B-continued

Acceptable standard values of Grade 2 incombustibility (quasi-incombustible material) according to JIS A-1321 combustion test

| Class | value (°C. × min.) | Fuming factor | lingering flame (sec.) | Cracking/ deformation |
|---|---|---|---|---|
| Annexed test | than 100 not more than 150 | than 60 not more than 60 | than 30 not more than 90 | degree — |

EXAMPLES 1–10 and COMPARATIVE EXAMPLES 1–3

Urethane modified polyisocyanurate foams were produced by spray foaming foam-forming solutions having compositions given in TABLE 3 by means of a high pressure airless type spray forming machine. In the preparation of the foams, a solution A which is a mixture of the ingredients defined in TABLE 3 excluding crude diphenylmethane diisocyanate and a solution B which is crude diphenylmethane diisocyanate were subjected to spray foaming. For every example potassium acetate was dissolved in dipropylene glycol or diethylene glycol.

The compounding recipe is shown in TABLE 3. The foaming behavior and the evaluation results of the combustion tests according to Incombustibility Standard of Japanese Railway Vehicle Materials and JIS A-1321 Grade 3 Incombustibility with respect to the resulting urethane modified polyisocyanurate foams are shown in TABLE 4. As seen from the results, the resulting foams using polyols covered by the appended claims (Examples 1-10) satisfied "fireproof requirements" according to the Incombustibility Standard of Japanese Railway Vehicle Materials and passed Grade 3 incombustibility according to JIS-A-1321 Test. On the other hand, the foams using the polyols not covered by the claims (Comparative Examples 1-3) could not pass both tests. Adhesion of the foams to a surface of an object such as lumber and metal material was good with every example.

TABLE 3

| COMPOUNDING RECIPE | Example 1 | Example 2 | Example 3 | Example 4 | Example 5 | Example 6 | Example 7 | Example 8 | Example 9 | Example 10 | Comparative Example 1 | Comparative Example 2 | Comparative Example 3 |
|---|---|---|---|---|---|---|---|---|---|---|---|---|---|
| SOLUTION B | | | | | | | | | | | | | |
| crude diphenylmethane diisocyanate (parts) | 100 | 100 | 100 | 100 | 100 | 100 | 100 | 100 | 100 | 100 | 100 | 100 | 100 |
| SOLUTION A | | | | | | | | | | | | | |
| polyol A (parts) | 28.13 | — | — | — | — | — | — | 20.0 | — | 38.3 | — | — | — |
| polyol B (parts) | — | 40.0 | 50.0 | — | — | — | — | 18.77 | — | — | — | — | — |
| polyol C (parts) | — | — | — | 38.3 | 43.16 | — | — | — | — | — | — | — | — |
| polyol D (parts) | — | — | — | — | — | 40.0 | 41.7 | — | 41.7 | — | — | — | — |
| polyol E (parts) | — | — | — | — | — | — | — | 20.0 | — | — | — | — | — |
| polyol F (parts) | — | — | — | — | — | — | — | — | — | — | 54.35 | 43.1 | 36.63 |
| polyol G (parts) | — | — | — | — | — | — | — | — | — | — | — | — | 8.39 |
| dipropylene glycol (parts) | 4.8 | 4.8 | 4.8 | 4.8 | 4.8 | 4.8 | 4.8 | 4.8 | 4.8 | — | 4.8 | 4.8 | 4.8 |
| diethylene glycol (parts) | — | — | — | — | — | — | — | — | — | 1.6 | — | — | — |
| potassium acetate (parts) | 1.2 | 1.2 | 1.2 | 1.2 | 1.2 | 1.2 | 1.2 | 1.2 | 1.2 | 0.8 | 1.2 | 1.2 | 1.2 |
| 2,4,6-tris(dimethylaminomethyl)phenol (parts) | 0.5 | 0.5 | 0.5 | 0.5 | 0.5 | 0.5 | 0.5 | 0.5 | 0.5 | — | 0.5 | 0.5 | 0.5 |
| N,N—dimethylethanol amine (parts) | — | — | — | — | — | 1.0 | — | — | — | — | 2.0 | 2.0 | 2.0 |
| dibutyltin dilaurate (parts) | 0.2 | 0.2 | 0.2 | — | 0.07 | — | 0.2 | 0.3 | 0.2 | 0.5 | — | — | — |
| stannous octoate (parts) | — | — | — | — | — | 0.017 | — | — | — | — | 0.1 | 0.3 | 0.3 |
| silicone surfactant (parts) | 1.0*1 | 1.0*1 | 1.0*1 | 1.0*1 | 1.0*1 | 1.0*2 | 1.0*1 | 1.0*1 | 1.0*1 | 1.0*1 | 1.0*2 | 1.0*2 | 1.0*2 |
| trichloromonofluoromethane (parts) | 23.0 | 25.0 | 27.0 | 25.0 | 27.0 | 26.0 | 26.0 | 27.0 | 26.0 | 31.0 | 26.6 | 28.0 | 27.0 |
| H$_2$O (parts) | — | — | — | — | — | — | — | — | 0.2 | — | — | — | — |
| OH/NCO of polyols | 0.218 | 0.218 | 0.272 | 0.218 | 0.246 | 0.180 | 0.188 | 0.277 | 0.188 | 0.34 | 0.295 | 0.235 | 0.281 |
| OH/NCO of dipropylene glycol | 0.072 | 0.072 | 0.072 | 0.072 | 0.072 | 0.072 | 0.072 | 0.072 | 0.072 | — | 0.072 | 0.072 | 0.072 |
| OH/NCO of diethylene glycol | — | — | — | — | — | — | — | — | — | 0.041 | — | — | — |

*1This surfactant is organo polysiloxanepolyoxyalkylene copolymer sold by Toray Silicon Co. Ltd., Japan under the tradename SH-193.
*2This surfactant is organo polysiloxanepolyoxyalkylene copolymer sold by Nippon Unicar Co. Ltd., Japan under the tradename L-5420.

Polyol A is poly(oxypropylene-oxyethylene)-polyether tetraol obtained from pentaerythritol as a base substance, containing 30% by weight of ethylene oxide, and having a molecular weight of 700 and a hydroxyl value of 320.

Polyol B is poly(oxypropylene-oxyethylene)-polyether tetraol obtained from pentaerythritol as a base substance; containing 20% by weight of ethylene oxide and having a molecular weight of 996 and a hydroxyl value of 225.

Polyol C is poly(oxypropylene-oxyethylene)-polyether tetraol obtained from pentaerythritol as a base substance, containing 40% by weight of ethylene oxide and having a molecular weight of 952 and a hydroxyl value of 235.

Polyol D is poly(oxypropylene-oxyethylene)-polyether tetraol obtained from pentaerythritol containing 20% by weight of ethylene oxide, and having a molecular weight of 1204 and a hydroxyl value of 186.

Polyol E is poly(oxypropylene-oxyethylene)-polyether tetraol obtained from pentaerythritol as a base substance, containing 30% by weight of ethylene oxide, and having a molecular weight of 4000 and a hydroxyl value of 56.

Polyol F is polyoxypropylenetretraol obtained from pentaerythritol, containing no ethylene oxide component, and having a molecular weight of 996 and a hydroxyl value of 225.

Polyol G is polyoxypropylenetetraol obtained from pentaerylthritol, containing no ethylene oxide, and having a molecular weight of 552 and a hydroxyl value of 405.

TABLE 4

| | Example 1 | Example 2 | Example 3 | Example 4 | Example 5 | Example 6 |
|---|---|---|---|---|---|---|
| Foaming behavior | | | | | | |
| cream time (sec.) | 2 | 2 | 2 | 2 | 2 | 2 |
| rise time (sec.) | 10 | 10 | 10 | 11 | 10 | 11 |
| foam density (kg/m$^3$) | 27.7 | 29.0 | 27.4 | 30.5 | 34.2 | 31.8 |
| Combustion Test according to Incombustibility Standard of Japanese Railway Vehicle Materials during burning of the alcohol | | | | | | |
| fire | present | present | present | present | present | present |
| flame | present | present | present | present | present | present |
| fume | moderate | moderate | moderate | moderate | moderate | moderate |
| flame going over the top end of the test piece | none | none | none | none | none | none |
| after the burning of the alcohol | | | | | | |
| lingering flame | none | none | none | none | none | none |
| cinder | none | none | none | none | none | none |
| carbonization reaching the periphery of the test piece | none | none | none | none | none | none |
| deformation reaching the periphery of the test piece | none | none | none | none | none | none |
| judgement | acceptable | acceptable | acceptable | acceptable | acceptable | acceptable |
| **JIS-A-1321 Combustion Test*[3]** | | | | | | |
| heat release value Td$\theta$ (°C. × min.) | 130.0 | 136.25 | 108.75 | 145.0 | 98.75 | 120.0 |
| fuming factor C$_A$ | 27.0 | 24.3 | 33.0 | 39.0 | 27.9 | 21.0 |
| cracking/deformation | none/small | none/small | none/small | none/small | none/small | none/small |
| lingering flame time (sec.) | 0 | 7 | 4 | 4 | 8 | 27 |
| exhaust temperature at any time within three minutes | below the reference temperature | below the reference temperature | below the reference temperature | below the reference temperature | below the reference temperature | below the reference temperature |
| Judgement | acceptable | acceptable | acceptable | acceptable | acceptable | acceptable |

| | Example 7 | Example 8 | Example 9 | Example 10 | Comparative example 1 | Comparative example 2 | Comparative example 3 |
|---|---|---|---|---|---|---|---|
| Foaming behavior | | | | | | | |
| cream time (sec.) | 2 | 2 | 2 | 2 | 2 | 2 | 2 |
| rise time (sec.) | 10 | 11 | 12 | 10 | 10 | 11 | 11 |
| foam density (kg/m$^3$) | 35.7 | 37.5 | 32.7 | 25.0 | 32.4 | 31.3 | 40.7 |
| Combustion Test according to Incombustibility Standard of Japanese Railway Vehicle Materials during burning of the alcohol | | | | | | | |
| fire | present | present | present | present | present | present | present |
| flame | present | present | present | present | present | present | present |
| fume | moderate | moderate | moderate | moderate | moderate | moderate | moderate |
| flame going over the top end of the test piece | none | none | none | none | present | present | present |
| after the burning of the alcohol | | | | | | | |
| lingering flame | none | none | none | none | present | present | present |
| cinder | none | none | none | none | none | none | none |
| carbonization reaching the periphery of the test piece | none | none | none | none | present | present | present |
| deformation reaching the periphery of the test piece | none | none | none | none | present | present | present |
| judgement | acceptable | acceptable | acceptable | acceptable | unacceptable | unacceptable | unacceptable |
| **JIS-A-1321 Combustion Test *[3]** | | | | | | | |
| heat release value Td$\theta$ (°C. × min.) | 146.25 | 196.25 | 72.5 | 120.0 | 150.0 | 155.0 | 405.0 |
| fuming factor C$_A$ | 71.7 | 47.4 | 69.0 | 33.6 | 30.0 | 36.0 | 141.3 |
| cracking/deformation | none/small | none/small | none/small | none/small | none/small | none/small | none/small |
| lingering flame time (sec.) | 17 | 14 | 15 | 5 | 0 | 10 | 38 |
| exhaust temperature at any time within three minutes | below the reference temperature | below the reference temperature | below the reference temperature | below the reference temperature | below the reference temperature | above the reference temperature | above the reference temperature |
| judgement | acceptable | acceptable | acceptable | acceptable | unacceptable | unacceptable | unacceptable |

*[3]All the test pieces used in examples 1-10 and comparative examples 1 to 3 are 22 cm × 22 cm × 2.5 cm in dimensions.

EXAMPLES 11-13

Laminates were manufactured by using urethane modified polyisocyanurate foams made from the compounding recipe of the following Table 5 as a core material.

TABLE 5

| COMPOUNDING RECIPE | Parts by weight |
|---|---|
| SOLUTION B | |
| crude diphenylmethane diisocyanate | 100 |
| SOLUTION A | |
| polyol D | 20 |
| diethylene glycol | 7.76 | to the fireproof property of Grade 2 incombustibility as shown in Table 6:

TABLE 6

|  | Example 11 | Example 12 | Example 13 |
|---|---|---|---|
| Surface Material | | | |
| front (thickness) | Wall paper coated with vinyl chloride resin (0.17mm) + aluminum foil (0.05mm)[*5] | Gypsum board (7mm) | Gypsum slug[*6] board (8mm) |
| back (thickness) | Aluminum foil (0.05mm) | Aluminum foil (0.05mm) | Aluminum foil (0.05mm) |
| Total Thickness of Test Piece | 24.0 | 28.0 | 25.0 |
| JIS-A-1321 Combustion Test | | | | | | |
| Class | Surface test | Annexed test | Surface test | Annexed test | Surface test | Annexed test |
| Heat release value $Td\theta$ (°C. × min.) | 0 | 0 | 0 | 0 | 0 | 0 |
| fuming factor $C_A$ | 20 | 15 | 6.0 | 9.6 | 4.5 | 10.5 |
| cracking/deformation | none/small | — | none/small | — | none/none | — |
| lingering flame time (sec.) | 10 | 2 | 5 | 0 | 15 | 3 |
| exhaust temperature at any time within three minutes | below the reference temperature | — | below the reference temperature | — | below the reference temperature | — |
| judgement | acceptable | acceptable | acceptable | acceptable | acceptable | acceptable |

[*5] a surface material obtained by lining aluminum foil to wall paper with an adhesive so as to face the former to the core material.
[*6] a board made from gypsum and slug.

TABLE 5-continued

| COMPOUNDING RECIPE | Parts by weight |
|---|---|
| potassium acetate | 0.2 |
| dibutyl tin dilaurate | 0.01 |
| silicone surfactant | 1.0[*4] |
| trichloromonofluoromethane | 28 |
| OH/NCO of polyol | 0.29 |
| OH/NCO of diethylene glycol | 0.199 |

[*4] The surfactant used is organo polysiloxanepolyoxyaklylene copolymer sold by Nippon Unicar Co. Ltd., Japan, under the tradename L-5420.

The laminate including the urethane modified polyisocyanurate foam as the core material was manufactured as follows.

In an aluminum mold of 40 cm of length and width each was placed a surface material having approximately the same size as that of the mold, and then the mold was heated up to about 38° C. in an oven. Separately, 300 g of the crude diphenylmethane diisocyanate was weighed in a stainless beaker of 0.51 capacity, while the ingredients other than the above diisocyanate were weighed in a polyethylene beaker of 11 capacity and thoroughly mixed to form a homogeneous solution. To this solution was added the above diisocyanate and then the resulting mixture was immediately stirred at a high speed for about 6 seconds to obtain a foam forming composition. Then, the composition was cast into the aluminum mold disposing the surface material therein. (In this case, two molds were provided and the composition was sequentially cast into these two molds.). Thereafter, an upper aluminum cover having another surface material at its inner surface was placed on the mold through a spacer of 25 mm thickness and fixed thereto by means of clamp or the like. This assembly was heated in an oven at a temperature of about 50° C. for 15 minutes to effect the curing and then the resulting laminate was taken out from the assembly. In this procedure, there were used surface materials as shown in the following Table 6.

The thus obtained laminate was examined according to JIS-A-1321 combustion test to obtain a result relating to the fireproof property of Grade 2 incombustibility as shown in Table 6.

The fire-resistant laminates of Examples 11-13 each comprise a front surface material shown in Table 6, a core material of the urethane modified polyisocyanurate foam, and a back surface material of aluminum foil having a thickness of 0.05 mm. As apparent from the data of Table 6, the laminates using the surface materials according to the invention were acceptable for Grade 2 incombustibility according to both the surface and annexed tests.

What is claimed is:

1. A process of producing urethane-modified polyisocyanurate foams by reacting an organic polyisocyanate with a polyol in the presence of a catalyst, a blowing agent and a surfactant to form a urethane-modified polyisocyanurate foam, wherein
   (1) said polyol is at least one poly(oxyalkylene-oxyethylene)polyether polyol having at least two functional groups and containing from about 10 to about 50% by weight of ethylene oxide;
   (2) the molecular weight of said polyol is within a range of about 500 to about 1500 when said polyol is used singly, and the average molecular weight $\overline{M}$ of said polyols is within a range from about 500 to about 2500 and is represented by the formula $$\overline{M} = \frac{M_1 A_1 + M_2 A_2 + \cdots}{A_1 + A_2 + \cdots}$$

wherein $M_1$, $M_2$, ... are molecular weights of said polyols, and $A_1$, $A_2$, ... are quantities thereof in parts by weight, when more than one said polyols are used in the form of a mixture;
   (3) said polyol is used in an equivalent ratio to organic polyisocyanate of about 0.05:1 to about 0.5:1; and
   (4) said catalyst is an alkali metal salt of a carboxylic acid or combination thereof with a tertiary amino compound.

2. The process as recited in claim 1, wherein said organic polyisocyanate is an aromatic polyisocyanate.

3. The process as recited in claim 1, wherein said organic polyisocyanate is a polynuclear polyisocyanate having the formula

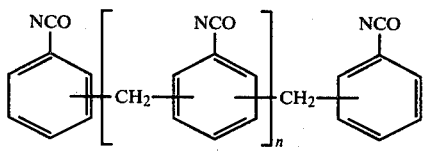

wherein n is 0 or an integer of more than one, or a mixture thereof.

4. The process as recited in claim 1, wherein said poly(oxyalkylene-oxyethylene)polyether polyol is obtained by reacting ethylene oxide and a compound selected from the group consisting of lower alkylene oxides and styrene oxide with a compound selected from the group consisting of ethylene glycol, propylene glycol, trimethylol propane, glycerin, 1,2,6-hexane triol, pentaerythritol, sorbitol, and sucrose.

5. The process as recited in claim 4, wherein said polyol is used in an equivalent ratio to said organic polyisocyanate of about 0.15:1 to about 0.4:1.

6. The process as recited in claim 1, wherein said alkali metal salt of carboxylic acid has a carbon number of 2 to 12 and is selected from the group consisting of potassium acetate, potassium propionate, potassium 2-ethylhexanoate, potassium caprylate and mixtures thereof.

7. The process as recited in claim 1 or 6, wherein said alkali metal salt of carboxylic acid is dissolved in at least one low molecular weight diol represented by the formula

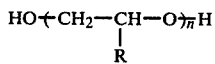

wherein R is hydrogen or methyl and n is 1, 2 or 3.

8. The process as recited in claim 7, wherein said low molecular weight diol is used in an equivalent ratio to said organic polyisocyanate of less than about 0.2:1.

9. The process as recited in claim 8, wherein said low molecular weight diol is used in an equivalent ratio to said organic polyisocyanate of about 0.01:1 to about 0.1:1.

10. The process as recited in claim 1, wherein said tertiary amino compound is selected from the group consisting of dialkylaminoalkyl phenols; triethylamine; triazine cyclic derivatives; tetraalkylalkylene diamines; triethylenediamine and its lower alkyl substituted derivatives; and mixtures thereof.

11. The process as recited in claim 10, wherein said dialkylaminoalkyl phenol is selected from the group consisting of 2,4,6-tris(dimethylaminoethyl)phenol, 2,4- and 2,6-bis(dimethylaminomethyl)phenols and mixtures thereof.

12. The process as recited in claim 1, 6 or 10 wherein said catalyst is a urethane formation promoting catalyst.

13. The process as recited in claim 12, wherein said catalyst is selected from the group consisting of dibutyl tin dilaurate, stannous octoate, N,N-dimethyl ethanol amine and triethylene diamine.

14. The process as recited in claim 1, wherein said blowing agent is a fluorinated and/or chlorinated low boiling inert solvent.

15. The process as recited in claim 14, wherein said blowing agent is trichloromonofluoromethane.

16. The process as recited in claim 1, wherein said blowing agent is water used in an amount of not more than 0.5 parts by weight per 100 parts by weight of said organic polyisocyanate.

17. The process as recited in claim 1, wherein said surfactant is an organosilicone surfactant, oxyethylated alkyl phenol, oxyethylated aliphatic alcohol, or ethylenepropylene oxide block polymer.

18. The process as recited in claim 1 or 17, wherein said surfactant is used in an amount of about 0.01 to about 5 parts by weight per 100 parts by weight of said organic polyisocyanate.

19. The process as recited in claim 1, wherein said reacting step further comprises:
   premixing said polyol, catalyst, blowing agent, and surfactant to form a premix solution; and
   spray foaming the premix solution and said organic polyisocyanate.

20. The process as recited in claim 1, wherein said reacting step further comprises:
   premixing said polyol, catalyst, blowing agent, and surfactant to form a premix solution; and
   injection foaming the premix solution and said organic polyisocyanate.

* * * * *